Nov. 1, 1955  G. W. SIEBENGARTNER ET AL  2,722,125
GYROSCOPIC CONTROL SYSTEM
Filed Dec. 10, 1952
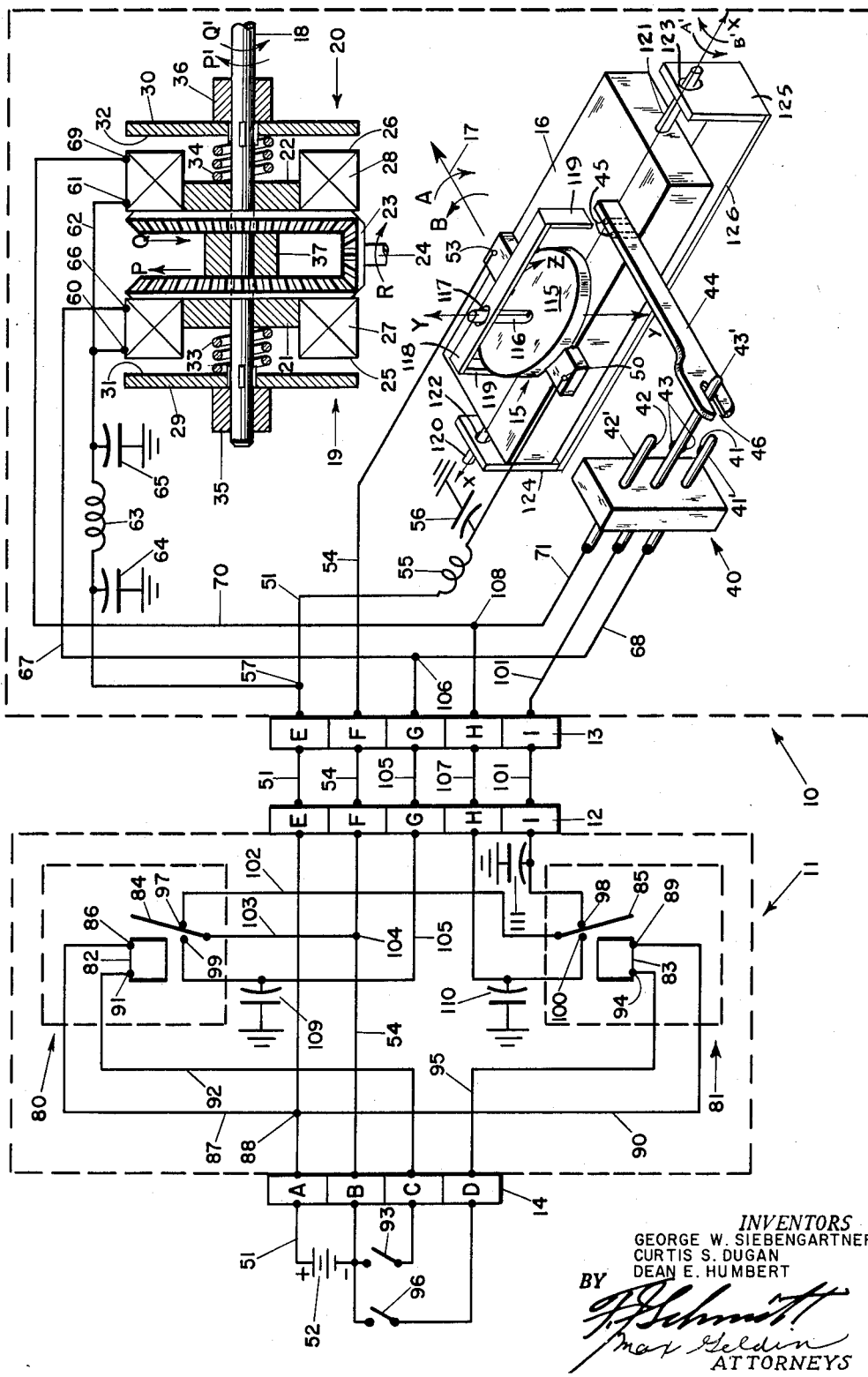
*INVENTORS*
GEORGE W. SIEBENGARTNER
CURTIS S. DUGAN
DEAN E. HUMBERT
BY
*ATTORNEYS*

United States Patent Office 2,722,125
Patented Nov. 1, 1955

2,722,125

GYROSCOPIC CONTROL SYSTEM

George W. Siebengartner, San Diego, and Curtis S. Dugan, Ventura, Calif., and Dean E. Humbert, Dayton, Ohio, assignors to the United of States America as represented by the Secretary of the Navy Application December 10, 1952, Serial No. 325,238

10 Claims. (Cl. 74—5.6)

(Granted under Title 35, U. S. Code (1952), sec. 266)

The invention described herein may be manufactured and used by or for the Government of the United States of America for governmental purposes without the payment of any royalties thereon or therefor.

The present invention relates to a gyroscopic control system and more particularly to a gyroscopic control system including a gyroscope and an electrical network which is controlled by precession of said gyroscope.

The present invention is particularly adapted for use in pilotless aircraft or so called "drones" wherein it is required that the aircraft remain stable about its roll axis during automatic operation and yet may be selectively operated from a remote position at any desired time. Prior art systems utilize a mechanical pickoff from the gryoscope gimbal by means of a cam slot and lever arrangement which applies pressure to the servo clutches of the system proportional to the rate of roll and gimbal precession. At low rates of roll, the force developed by the cam slot and lever structure has proved to be inadequate to provide sufficient pressure to the servo clutches to transmit the required torque to the shaft which operates the aileron control surfaces of the aircraft. Consequently, insufficient torque may be transmitted to the ailerons to overcome the wind forces acting on the ailerons and as a result, such systems do not adequately correct for slow rates of roll. Furthermore, the clearances in the cork-faced clutches utilized in such systems are affected by humidity, and since these clearances are critical when proportional clutching is employed, continual adjustments are required to compensate for changes in humidity. Such systems also employ a separate set of clutches for rate or automatic operation and for command or selective operation.

The present invention employs a pair of electromagnetic clutches which serve to perform both the rate and command function of the system and such clutches are substantially unaffected by changes in humidity. The clutches employed in the present invention are either fully engaged or disengaged rather than being proportionally engaged as in prior art systems, and therefore, the clearances in the invention clutches are much less critical and the necessity for adjustments thereof is greatly diminished. A single-pole, double-throw switch is connected to the gimbal of the gyroscope whereby the servo-clutches are energized upon precession of the gyroscope and thus the system is sensitive to low rates of roll and a constant torque output is provided by the clutches at all rates of roll. An electrical network is provided whereby the clutches may be selectively operated by a command signal to alter the position of the aircraft about its roll axis, whereupon the rate or automatic system will maintain the aircraft stable about said axis in the altered position until another command signal is received by the system.

It should be understood that in pilotless aircraft, individual systems are employed to stabilize the aircraft about its various axes, and the present invention is a system which is adapted to stabilize the aircraft about the axis of roll.

An object of the present invention is the provision of a gyroscopic control system for aircraft which is sensitive to low rates of roll and which responds quickly to rolling moments acting on the aircraft yet insures that sufficient torque is transmitted to the control surfaces thereof to overcome the wind forces acting thereon.

Another object is to provide a gyroscopic control system employing but a single pair of clutches in which the necessity for adjusting the clutch clearances is greatly reduced.

A further object of the invention is the provision of a gyroscopic control system which automatically stabilizes the aircraft about its roll axis and which provides a means whereby the position of the aircraft may be selectively altered.

Still another object is to provide a gyroscopic control system which is simple in construction and employs a minimum of parts, yet which is sensitive and reliable in operation.

Other objects and many of the attendant advantages of this invention will be readily appreciated as the same becomes better understood by reference to the following detailed description when considered in connection with the accompanying drawing which illustrates a schematic view of a preferred embodiment of the invention.

In the drawing, a gyro-servo unit indicated generally by reference numeral 10 is connected to a junction box indicated generally by reference numeral 11 by means of "Cannon" connectors 12 and 13 having five matching terminals E, F, G, H, I, and the remainder of the system is shown as being connected to the opposite end of junction box 11 by means of a "Cannon" connector 14 having terminals A, B, C, and D. It should be understood that the entire system may be incorporated as a single unit thereby eliminating the "Cannon" connectors, and that the drawing illustrates a preferred arrangement whereby certain components of the system may be easily assembled and disassembled.

The rate gyro-servo unit 10 contains a gyroscope 15 mounted within a gimbal 16 which is suitably journaled within the gyro-servo unit so as to pivot about the axis X—X in accordance with precessional movements of the gyroscope. Gyroscope 15 comprises a motor having a rotor 115 of relatively large mass which is adapted to spin about the axis Y—Y in the direction of arrow Z. Rotor 115 is fixed to a shaft 116, the opposite ends of which are rotatably journaled in bearings 117, only one of which is visible. Bearings 117 are mounted in identical plates 118, the opposite ends of which are supported by upstanding leg members 119 suitably fixed to opposite surfaces of gimbal 16. Studs 120, 121 are formed integral with opposite end portions of gimbal 16 and are journaled in bearings 122, 123 which are mounted in leg members 124 and 125 respectively. The leg members are secured at the lower ends thereof to the opposite ends of a base member 126 which is adapted to be suitably connected to a fixed portion of the aircraft structure. The longitudinal axis of the aircraft, or the direction of flight, is indicated by arrow 17, and it should be noted that the longitudinal axis of the aircraft is perpendicular to the pivot axis X—X of gimbal 16. It is therefore evident that rolling movements of the aircraft about its longitudinal axis will cause precession of the gyroscope and consequent rotation of gimbal 16 about axis X—X, and such rotation may be utilized as hereinafter more fully explained.

Shaft 18 is journaled within the gyro-servo unit and is suitably connected to the ailerons of the aircraft through the intermediary of aileron control arms whereby rotational movements of shaft 18 will cause the position of the ailerons to be altered, and consequently develop rolling moments about the longitudinal axis of the aircraft. A pair of conventional electromagnetic servo clutches are indicated generally by reference numerals 19 and 20, and the driving clutch members 21 and 22 thereof respectively are rotatably mounted upon shaft 18. Members 21 and 22 are maintained in the proper spaced relationship by a spacer member 37 interposed between said members. Members 21 and 22 are driven in opposite directions as indicated by arrows P and Q respectively by a pinion 23 rigidly secured to a shaft 24 which is driven in the direction of arrow R through suitable gearing by the gyro-motor, and thus it may be seen that the gyro-motor not only provides the gyroscopic action in the system, but also provides the force to drive the servo-clutches. The driving connection between shaft 24 and the gyro motor is preferably of the type shown in U. S. Patent No. 2,635,836 wherein the rotor of the gyroscope unit is geared to a driven shaft through the intermediary of a universal coupling whereby the gyroscope may precess while maintaining a continuous driving connection with the driven shaft. Driving clutch members 21 and 22 have clutch faces 25 and 26 respectively formed thereon, said faces being composed of suitable insulating material such as rubber or the like, and conventional operating coils 27 and 28 are mounted upon members 21 and 22 respectively closely adjacent to said clutch faces. Driven clutch members 29 and 30 are provided having clutch faces 31 and 32 respectively formed thereon, said faces being composed of magnetic material, and members 29 and 30 are splined or keyed on shaft 18 whereby they are free to slide axially along the shaft but are constrained to rotate therewith. Spring members 33 and 34 are positioned between the driving and driven clutch members whereby the clutch faces thereof are urged apart and no torque is transmitted from the driving to the driven members. Bearings 35 and 36 serve to rotatably support shaft 18 and to limit the axial displacement of members 29 and 30.

When either of the operating coils 27 or 28 is energized, the associated driven clutch member 29 or 30 respectively is magnetically attracted toward the corresponding driving clutch member, overcoming the force of the spring members. The driven clutch member will continue to move toward the driving clutch member until the clutch faces are in engagement whereupon the full driving torque will be transmitted from the gyro-motor through the intermediary of the driven clutch member and shaft 18 to the aileron control surfaces of the aircraft.

A control or switch means indicated generally by reference numeral 40 comprises a single-pole double-throw switch having relatively stationary contacts 41 and 42 mounted on fixed switch members 41' and 42' respectively, and a movable contact 43 mounted upon a movable switch member 43' positioned intermediate members 41' and 42'. It should be understood that the contacts must be suitably insulated from other components of the system. An actuator arm 44 is secured at one end by means of bolts 45 to gimbal 16 and has a longitudinally extending slot 46 formed in the opposite end thereof. Member 44 may be formed of a suitable insulating material such as "Lucite" or "Plexiglass," or member 44 may be formed of metal and suitably insulated from the gimbal. Switch member 43' is slidably disposed in slot 46 whereby upon precession of the gyroscope gimbal about axis X—X, arm 44 will urge contact 43 into engagement with one of the contacts 41 or 42. Suitable stop means (not shown) may be provided to limit the rotational movement of the gimbal such that movement of member 43' is confined to the operational limits of switch 40. A first pole 50 of the gyro-motor is connected by means of lead 51 to one terminal of a source of electrical energy such as a battery 52, and the other pole 53 of the gyro-motor is connected by means of lead 54 to the opposite terminal of the battery. In this manner, the gyro-motor is continuously supplied with a source of electrical energy and is therefore in constant operation when the system is in assembled position as shown. Coil 55 and capacitor 56 shunted to ground serve as a filter to prevent excessive arcing and wear of the brush contacts of the motor.

The opposite ends of coil 27 are connected to terminals 60 and 66, and the opposite ends of coil 28 are connected to terminals 61 and 69. Terminals 60 and 61 of operating coils 27 and 28 respectively are connected to a lead 62 by means of conventional slip rings (not shown) mounted on the outer periphery of the coils, the slip rings being engaged by conventional brushes (not shown) connected to lead 62. Terminals 60 and 61 are connected to the positive terminal of the power source by means of lead 62, junction 57 and lead 51. Coil 63 and capacitors 64 and 65 shunted to ground serve as a filter to prevent excessive arcing and wear of the driving faces of the clutch members. The opposite terminal 66 of operating coil 27 is connected to a lead 67 by a conventional slip ring and brush connection (not shown), and thence by means of junction 106 to lead 68 which is suitably connected to contact 41, and the opposite terminal 69 of coil 28 is connected to a lead 70 by a conventional slip ring and brush connection (not shown), and thence by means of junction 108 to lead 71 which is suitably connected to contact 42.

Referring now to junction box 11, two relays indicated generally by reference numerals 80 and 81 are contained therein, and these relays include relay coils 82 and 83 and relay armatures or switches 84 and 85 respectively. One terminal 86 of relay coil 82 is connected to the positive terminal of battery 52 by means of lead 87, junction 88 and lead 51 and one terminal 89 of relay coil 83 is connected to the positive terminal of battery 52 by means of lead 90, junction 88, and lead 51. The opposite terminal 91 of relay coil 82 is connected by means of lead 92 to one terminal of a switch 93, the opposite terminal of the switch being connected to the negative terminal of the battery. The opposite terminal 94 of relay coil 83 is connected by means of lead 95 to one terminal of a switch 96, the opposite terminal of the switch being connected to the negative terminal of the battery. Armatures 84 and 85 are normally urged into engagement with contacts 97 and 98 respectively by a suitable means such as a spring (not shown), and it is apparent that upon closure of switches 93 and 96, relay coils 82 and 83 respectively will be energized, and the relay armatures 84 and 85 urged into engagement with contacts 99 and 100 respectively. Switches 93 and 96 may be selectively operated by any suitable remotely controlled mechanisms adapted to be actuated by a command signal which is transmitted at a remote position.

Contact 43 is connected to the negative pole of battery 52 by means of lead 101, contact 98, armature 85, lead 102 contact 97, armature 84, lead 103, junction 104, and lead 54. It is apparent that when relay armatures 84 and 85 are in their normal position and relay coils 82 and 83 are not energized, that the circuit will be closed between contact 43 and the negative pole of the battery. Contact 99 is connected by means of lead 105 to junction 106, and contact 100 is connected by means of lead 107 to junction 108. Capacitors 109, 110, and 111, which are shunted to ground serve to prevent excessive arcing and wear of contacts 97—100 and contacts 41—43.

The operation of the device is as follows: The system is assembled such that the components thereof are connected as shown in the drawing, and since the gyro-motor is connected in series with battery 52 by means of leads 51 and 54, the rotor of the gyro-motor continuously rotates and serves as a gyroscopic mass. Switches 96 and 93 are open during automatic operation of the system, and armatures 84 and 85 are in engagement with contacts 97 and 98 respectively.

Assuming that the plane is in flight and the system is under automatic operation, if an external force acting on the aircraft causes a rolling moment and consequent tendency of the aircraft to move about the longitudinal axis 17 in a clockwise direction as indicated by arrow A, gyroscope 15 and gimbal 16 will precess about axis X—X in the direction of arrow A' in a well known manner. Arm 44 therefore moves downward and contact 43 engages contact 41 whereby a circuit is completed from battery 52 through operating coil 27. The circuit through coil 27 may be traced from the positive pole of battery 52 through lead 51, junction 57, lead 62, terminal 60, coil 27, terminal 66, lead 67, junction 106, lead 68, contacts 41 and 43, lead 101, contact 98, armature 85, lead 102, contact 97, armature 84, lead 103, junction 104 and lead 54 to the negative pole of the battery.

Upon energization of operating coil 27, clutch 19 is engaged, and shaft 18 will be driven in the direction of arrow P'. Shaft 18 is suitably connected to the ailerons of the aircraft such that rotation of the shaft in the direction of arrow P' will cause the ailerons to be moved so as to produce a counterclockwise rolling moment and consequent tendency of the plane to move in a counterclockwise direction about the longitudinal axis of the aircraft.

It is apparent that the rolling moment produced by movements of the ailerons is in opposition to the moment produced by the external force acting on the aircraft and consequently, there will be no resultant moment and the aircraft will therefore remain stable about its longitudinal axis. As long as the external force continues to produce a rolling moment upon the aircraft, the gyroscope and gimbal will tend to precess about axis X—X. However, when the force is removed, gyroscope 15 and gimbal 16 will return to normal positions as shown in the drawing and contact 43 will be positioned midway between contacts 41 and 42, thereby opening the circuit through coil 27 and allowing spring 33 to disengage clutch 19, whereupon shaft 18 will cease to rotate and the ailerons will no longer be actuated by the servo unit.

When clutch 19 is disengaged, the ailerons are free to rotate, and the wind forces acting on the ailerons will "streamline" them, or in other words, force them into their neutral position wherein their surfaces are flush with the wing surfaces and no rolling moments are developed.

Assuming that the plane is in level flight and under automatic operation, if an external force acting on the aircraft causes a rolling moment and consequent tendency of the aircraft to move about longitudinal axis 17 in a counterclockwise direction as indicated by arrow B, gyroscope 15 and gimbal 16 will precess about axis X—X in the direction of arrow B'. Arm 44 therefore moves in an upward direction and contact 43 engages contact 42 whereby a circuit is completed from the battery through operating coil 28. The circuit may be traced from the positive pole of battery 52 through lead 51, junction 57, lead 62, terminal 61, coil 28, terminal 69, lead 70, junction 108, lead 71, contacts 42 and 43, lead 101, contact 98, armature 85, lead 102, contact 97, armature 84, lead 103, junction 104 and lead 54 to the negative terminal of the battery.

Energization of coil 28 causes clutch 20 to be engaged and shaft 18 will be driven in the direction of arrow Q'. Shaft 18 is suitably connected to the ailerons of the aircraft such that rotation of the shaft in the direction of arrow Q' will cause the ailerons to be moved so as to produce a clockwise rolling moment and consequent tendency of the plane to move in a clockwise direction about the longitudinal axis of the aircraft. Since the rolling moment produced by movement of the ailerons is in opposition to the moment produced by the external force acting on the aircraft, there will be no resultant moment and the aircraft will remain stable about its longitudinal axis. The gyroscope and gimbal will tend to precess as long as the external force continues to produce a rolling moment upon the aircraft, but when the force is removed, the gyroscope and gimbal will return to their normal positions as shown in the drawing. Contact 43 will then be disengaged from contact 42, de-energizing coil 28 and clutch 20 will be disengaged by spring 34. The ailerons will then be "streamlined" or returned to their neutral positions by the wind forces acting thereon as previously described.

If it is desired to arbitrarily roll the plane in a counterclockwise direction, switch 93 is closed by actuating the remotely controlled mechanism by a suitable command signal, and a circuit is completed from the battery through operating coil 27 thereby engaging clutch 19. Since such a rolling motion of the plane causes precession of the gyroscope and gimbal in the direction of arrow B', contact 43 engages contact 42, and as pointed out previously, such engagement will ordinarily complete a circuit from the battery through coil 28. However, relays 80 and 81 provide a means whereby when a command signal closes either of switches 93 or 96, the connection between contact 43 and the negative terminal of the battery will be interrupted and switch 40 thereby inactivated. When switch 93 is closed, a circuit will be completed through relay coil 82, whereupon armature 84 will be disengaged from contact 97 and urged into engagement with contact 99. It is apparent that when armature 84 is disengaged from contact 97, the connection between leads 102 and 103 is interrupted and contact 43 is no longer connected to the negative terminal of the battery.

The circuit through relay coil 82 may be traced from the positive pole of the battery through lead 51, junction 88, lead 87, terminal 86, relay coil 82, terminal 91, lead 92 and switch 93 to the negative pole of the battery. When armature 84 is urged into engagement with contact 99, a circuit is completed through coil 27 whereby clutch 19 is activated, causing the ailerons to be moved in such a direction as to roll the plane in a counterclockwise direction as previously described. The circuit through coil 27 may be traced from the positive pole of the battery through lead 51, junction 57, lead 62, terminal 60, coil 27, terminal 66, lead 67, junction 106, lead 105, contact 99, armature 84, lead 103, junction 104, and lead 54 to the negative terminal of the battery. It is therefore evident that upon closing switch 93 by a command signal, operating coil 27 is energized and switch member 43 is disconnected from the negative terminal of the battery.

When the aircraft has been suitably altered in position, switch 93 is opened, whereupon relay coil 82 is de-energized and armature 84 is urged out of engagement with contact 99 and into engagement with contact 97. This serves to disconnect coil 27 from the negative terminal of the battery whereby clutch 19 is disengaged, and it also serves to again connect contact 43 to said negative terminal.

When switch 93 is opened and clutch 19 is disengaged, a counterclockwise rolling moment due to the inertia of the aircraft is acting thereon and consequently the aircraft tends to continue rolling in a counterclockwise direction. However, this moment causes gyroscope 15 and gimbal 16 to precess about axis X—X in the direction of arrow B' whereby contact 43 engages contact 42 and clutch 20 is engaged. Upon engagement of clutch 20, the ailerons are moved so as to produce a clockwise moment, and since this moment is in opposition to the moment produced by the inertia of the aircraft, there is no resultant rolling moment and the aircraft will cease to roll.

When the rolling motion of the aircraft ceases, the gyroscope and gimbal will return to their normal positions as shown in the drawing and clutch 20 will be disengaged as previously described. The system is then in position for automatic operation and will stabilize the plane about its axis of roll in the altered position.

If it is desired to arbitrarily roll the plane in a clockwise direction, switch 96 is closed by a suitable command signal whereupon relay coil 83 is energized and armature 85 is urged out of engagement with contact 98 and into engagement with contact 100. The circuit through coil 83 may be traced from the positive terminal of battery 52 through lead 51, junction 88, lead 90, coil 83, lead 95 and switch 96 to the negative terminal of the battery. When armature 85 is disconnected from contact 98, contact 43 is disconnected from the negative terminal of the battery and the circuit is completed through coil 28, whereby clutch 20 is engaged, causing the ailerons to be moved in such direction as to produce a clockwise moment about the longitudinal axis of the plane as pointed out previously. The circuit through coil 28 may be traced from the positive terminal of the battery through lead 51, junction 57, lead 62, terminal 61, coil 28, terminal 69, lead 70, junction 108, lead 107, contact 100, armature 85, lead 102, contact 97, armature 84, lead 103, junction 104 and lead 54 to the negative terminal of the battery.

When the aircraft is in the desired altered position, switch 96 is opened, whereupon relay coil 83 is de-energized and armature 85 is urged out of engagement with contact 100 and into engagement with contact 98. Since the clockwise rolling movement of the plane has caused the gyroscope and gimbal to precess about axis X—X in the direction of arrow A', contacts 41 and 43 are in engagement thereby causing clutch 19 to be actuated which produces a moment in opposition to the rolling moment of the aircraft, and the aircraft will therefore cease its rolling motion. Upon cessation of the rolling motion of the aircraft, clutch 19 is disengaged and the system is again connected for automatic operation in a manner similar to that when switch 93 is opened.

It should be noted that the invention system is sensitive to low rates of roll since gyroscope 15 and gimbal 16 precess and engage the switch contacts when a very small rolling moment acts on the aircraft. Furthermore, since such precession occurs almost instantaneously when a rolling moment is produced, thereby closing switch 40 and energizing the proper servo clutch, it is evident that the system responds quickly to rolling moments acting on the aircraft. Since clutches 19 and 20 are fully engaged when coils 27 and 28 repectively are energized, all of the torque developed by the gyro-motor will be transmitted to the ailerons when one of the clutches is engaged, thereby insuring that sufficient torque is transmitted to the ailerons to overcome the wind forces acting thereon.

The components of the conventional electro-magnetic clutches utilized in the invention system are substantially unaffected by changes in humidity, and since the invention clutches are either fully engaged or disengaged rather than being proportionally engaged, the clearances between the driving and driven clutch members in the disengaged position are not critical, whereby very few adjustments of these clearances are necessary.

From the foregoing, it is apparent that there is provided a gyroscopic control system utilizing but a single pair of clutches and in which the necessity for clutch adjustments is greatly diminished. The system is sensitive to a low rate of roll, and it responds quickly to rolling moments acting on the aircraft. The invention system is automatic in operation but may be selectively operated from a remote position, and it employs a minimum of parts and is simple in construction, yet sensitive and reliable in operation.

Obviously many modifications and variations of the present invention are possible in the light of the above teachings. It is therefore to be understood that within the scope of the appended claims the invention may be practiced otherwise than as specifically described.

We claim:

1. A gyroscopic control system which comprises a plurality of clutch means, an electrical network adapted to actuate each of said clutch means, a rate gyroscope mounted within a gimbal and adapted to precess about the pivotal axis of said gimbal, said network including a control means automatically operated by precession of said gyroscope, said control means being adapted to cause actuation of each of said clutch means, and means for selectively operating said clutch means and substantially simultaneously causing said control means to be ineffective in controlling said clutch means.

2. In combination, a gyro-motor mounted within a gimbal, said motor having a rate gyroscope comprising a rotor of relatively large mass, said gimbal being pivotally mounted within a supporting structure, a plurality of clutches driven by said motor, an electrical network including a switch means having a member connected to said gimbal, said switch means being activated upon precession of said gyroscope and being adapted to actuate each of said clutches, and selectively operable means for actuating said clutches and inactivating said switch means.

3. In a gyroscopic control system, a supporting structure, a rate gyroscope mounted within a gimbal pivotally mounted within said supporting structure, said gimbal being pivoted about an axis normal to the longitudinal axis of said structure whereby said gyroscope is adapted to precess upon movement of said structure about its longitudinal axis, a plurality of clutches adapted to move a control surface, an electrical network including a control means operatively connected to said gimbal and being constructed and arranged to cause actuation of said clutches, and selectively operable means for actuating said clutches and causing said control means to become ineffective in operating said clutches.

4. In a gyroscopic control system, a gyro-motor mounted within a gimbal, said motor having a rate gyroscope comprising a rotor of relatively large mass, said gimbal being pivotally mounted within a supporting structure, a plurality of electromagnetic clutches, the driving members of said clutches being operatively connected to said motor and the driven members of said clutches being operatively connected to a control surface, an electrical network including a source of electrical energy connected to said motor, switch means adapted to connect each of said clutches to said source through a circuit including said switch means and selectively operable means adapted to connect said clutches to said source and open said switch circuit.

5. A system as defined in claim 4, said switch means comprising a plurality of relatively stationary contacts and a movable contact mounted upon a switch member positioned therebetween, said switch member being connected to said gambal, whereby said movable contact is urged into engagement with one of said stationary contacts upon movement of said gimbal about its pivotal axis.

6. A system as defined in claim 1 wherein said network includes a source of electrical energy, said control means being connected in a series with said source, and said selectively operable means being connected in series with said source and in parallel with said control means.

7. A system as defined in claim 3 wherein said network includes a source of electrical energy and a relay comprising a relay coil and a relay armature, said armature being connected in series with said source and said control means, and said coil being connected in parallel with said control means.

8. In a gyroscopic control system, a rate gyroscope mounted within a gimbal, a control switch connected to said gimbal, a plurality of electromagnetic clutches each of which has an operating coil, and an electrical network including a source of electrical energy, said operating coils and said switch being connected in series with said source, a plurality of relay armatures connected in series with said switch, each of said armatures having a relay coil connected in parallel therewith, and a plurality of switches connected in series with said relay coils, and being adapted to energize said coils and disconnect said control switch from one terminal to said source.

9. In a gyroscopic control system, a rate gyroscope comprising a gyro-motor having a rotor of relatively large mass, said motor being mounted within a gimbal, pivotally mounted within a supporting structure, a switch member connected to said gimbal and having a movable contact mounted thereon adapted to engage either of two relatively stationary contacts associated therewith in response to pivotal movement of said gimbal, an electromagnetic clutch connected in series with each of said stationary contacts, a source of energy connected in series with said clutches and said stationary contacts, said motor being connected in parallel with said switch member, a plurality of relay armatures normally connecting said movable contact to one terminal of said source and each of which is adapted to be connected to one of said clutches, each of said armatures having a relay coil associated therewith, said relay coils being connected in series with a selectively operable control means and in parallel with said switch member, whereby upon energization of said relay coils, said one terminal of said source is disconnected from said switch member and connected to one of said clutches.

10. In a gyroscopic control system, a rate gyroscope comprising a gyro-motor mounted within a gimbal, said motor having a rotor of relatively large mass, said gimbal being pivotally mounted within a supporting structure, a plurality of electromagnetic clutches each of which has an operating coil, the driving members of said clutches being operatively connected to said motor and the driven members of said clutches connected to aircraft control members, a switch member connected to said gimbal and having a movable contact mounted thereon adapted to engage either of two relatively stationary contacts associated therewith in response to precession of said gyro-motor, an electrical network including a source of electrical energy connected in series with said operating coils and said stationary contacts, said motor being connected in parallel with said clutches, a plurality of relay armatures having a first position normally connecting said movable contact in series with one terminal of said source, each of said armatures having a second position completing a series circuit including one of said operating coils and said source and disconnecting said movable contact from said one terminal, each of said armatures having a relay coil associated therewith, each of said relay coils being connected in series with a selectively operable control means and in parallel with said movable contact, whereby upon energization of one of said relay coils, the associated armature is moved from its first to its second position.

References Cited in the file of this patent

UNITED STATES PATENTS

| | | |
|---|---|---|
| 1,418,335 | Sperry | June 6, 1922 |
| 2,635,836 | Summers | Apr. 21, 1953 |